United States Patent [19]

Horowitz et al.

[11] Patent Number: 4,525,071

[45] Date of Patent: Jun. 25, 1985

[54] ADDITIVE INVENTORY CONTROL, BATCHING AND DELIVERY SYSTEM

[75] Inventors: Franklin B. Horowitz, Stamford; Martin Pfeffer, Norwalk, both of Conn.; Herold T. Hertanu, New York, N.Y.

[73] Assignee: Crawford & Russell, Inc., Stamford, Conn.

[21] Appl. No.: 615,583

[22] Filed: May 31, 1984

[51] Int. Cl.$^3$ .................... B01F 15/04; G05D 11/02
[52] U.S. Cl. .................... 366/152; 364/478; 366/18
[58] Field of Search .................... 366/152, 141, 16, 17, 366/18, 19, 160, 132; 364/478, 479, 189; 222/57

[56] References Cited

U.S. PATENT DOCUMENTS

| | | | |
|---|---|---|---|
| 3,822,056 | 7/1974 | Hawes | 366/114 |
| 3,843,099 | 10/1974 | Duncan | 366/152 |
| 3,959,636 | 5/1976 | Johnson | 364/189 |
| 4,111,335 | 9/1978 | Arya | 222/57 |
| 4,265,266 | 5/1981 | Kierbow | 366/152 |
| 4,265,858 | 5/1981 | Crum | 366/152 |

*Primary Examiner*—Robert W. Jenkins

*Attorney, Agent, or Firm*—Mattern, Ware, Stoltz & Fressola

[57] ABSTRACT

A system for handling a multitude of particulate solid minor ingredients to be selectively added to individual batches in a batch treatment blending process comprises storage vessels, inventory control methods, recipe correction methods, a batch weighing system and weighing trolley for feed to one of a series of blenders. The system's mechanical components are under fully automated control by a computer, using bar code scanners. Inventory control is accomplished by providing dedicated storage vessels and a weighing system whose output signals are monitored by the computer. The functions of batch weighing and batch delivery for particulate solids employ a number of carriers which serve as dedicated delivery containers. Each carrier is carried on a trolley rail system and the trolley moves the carrier to various nests of solids storage vessels for weigh-in filling of the minor ingredients by screw type feeders, as directed by the computer, and based on the computer-stored recipe information. Each filled carrier is then carried by trolley to deliver its weighed contents to its preselected blender. For efficient high-volume operation, the carriers can be transferred to and from storage racks by transfer robots.

15 Claims, 20 Drawing Figures

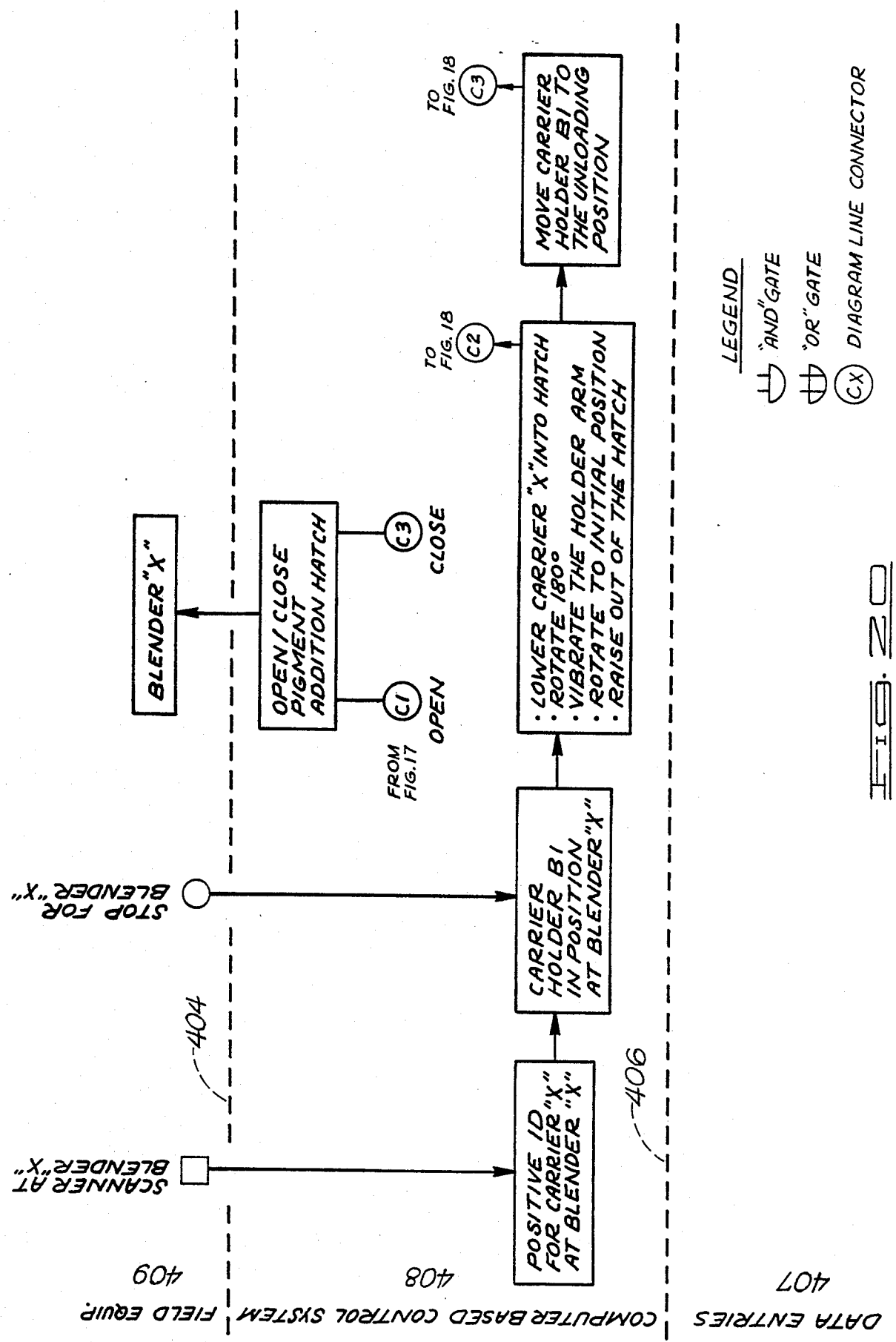

ADDITIVE INVENTORY CONTROL, BATCHING AND DELIVERY SYSTEM

BACKGROUND

It is common practice in processing plants which use particulate solids in a batch mixing operation to use fully automated systems to handle major ingredients which might comprise 90% to 95% by weight of the batch mix. However, the remaining 5% to 10% of the particulate solids, which are termed minor ingredients, are handled manually. Often, the various batch mixes call for a large number of these minor ingredients, which are also known as additives. These might be colors, stabilizers, antioxidants, fillers, fibers, vitamins, minerals, activators and so forth, which are part of the product recipe. The number of minor ingredients which must be stored and processed often approaches 100 or more, when many products are produced simultaneously in a battery of batch mixers. In the prior art, no system is disclosed which attempts to store, formulate, and feed automatically the large number of minor solid ingredients in the manner of the present invention.

The prior art for the batch weighing and delivery of a large number of particulate solids minor ingredients used manual labor for making weighments on a bench type scale. These ingredients were manually scooped out of a shipping container such as a fiber drum, into a portable container and then delivered manually to a batch mixer, where they are added through a hatch. The recipe for formulating said minor ingredients batch was hand-written on a production information card, which was supplied to the formulator by a shift supervisor. There have been several attempts to devise batching systems for minor ingredients in the past, but none of them approach the large scope of the present system's capabilities in such a practical way. Nor do they utilize the actions of robots and bar codes to effect a fully integrated solids handling system. In U.S. Pat. No. 4,265,266 to Kierbow et al, U.S. Pat. No. 3,959,636 to Johnson et al, U.S. Pat. No. 3,822,056 to Hawes Jr et al, and U.S. Pat. No. 4,111,335 to Arya et. al, batching systems for minor ingredients are disclosed, but these do not foreshadow the present invention consisting of modular nests of four storage bins, cooperating with the weighing trolley, dedicated carriers, empty and filled carrier storage racks, the blender feed trolley, with robots transferring carriers back and forth, under computer control.

SUMMARY OF THE INVENTION

The present invention is a fully integrated batching system, which automates the storage and feed of minor ingredients as solids and liquids to a batch blending operation. This system is applicable to a wide range of industries, where it will upgrade the traditional manual handling of minor ingredients to an automatic, computer controlled system. Typical industries that can benefit are the plastics, chemical, pharmaceutical, cosmetics, food, and other similar industries, employing processes which have a reasonably large number of minor ingredients, since it is in these plants that the inventory control and batch mixing is a problem.

Inventory control and batching functions for solids are based on weighing devices which consist of electronic load cells, which have an accuracy of 0.1% of full scale. The carrier which is provided for solids batching can have a capacity of up to 400 pounds per batch of solids additives, limited by robot load capacity. For liquid additives, there is no limitation on batch size. Accuracy for liquids is ±0.5% weight, based on the use of a positive displacement flow totalizer.

This system uses a combination of modular components, providing a high degree of flexibility in design. The following components are the major parts of the invention: a storage bin system including a weighing system for solids inventory, weighing systems for solids batching, solids carriers, a weighing trolley, a blender feed trolley, empty and full carrier storage racks, robots, a liquid metering system, a recipe correction system, a computer control system; bar code systems, and dust control systems.

The present invention provides for storage of the particulate solids in individual dedicated storage bins, mounted on load cells which communicate with a computer to give the status of inventory of each particulate ingredient at any instant in time. Additions to inventory are fed into the computer via a portable light pen scanner and bar code system in the raw materials warehouse area. Subtractions from inventory are recorded by loss-in-weight inputs from the batching load cells. Another function of this bar code system is to prevent cross-contamination of ingredients when they are loaded into the storage bins, by requiring an identity of codes on the shipping container and the storage bin, before an automatic lock on the bin will unlatch. The bins are provided with dust hoods, which ensure a safe and clean operation.

The present invention provides for automatic batching of the several solid ingredients from the storage bins into a specially designed carrier. The carrier is a cylindrical body, with a rounded bottom and a flat top, with a lid that both swings open in a vertical arc and pivots open in a horizontal arc. Prior to the weighing operation, the lid pivots open in the horizontal direction, and during a subsequent operation when the ingredients are dumped into a blender, the vertical opening motion is used.

The present invention provides both empty carrier storage racks and full carrier storage racks, which are the means for providing operating time float during the movements of the carriers on the weighing trolley and the blender feed trolley. The storage racks provide dedicated rows for each set of carriers, based upon the blender which they serve. The rows have ball bearing rollers which allow the carriers to ride freely in and out. The rows tilt toward the out position, to provide gravity feed of the carries, which ride on the rollers. There is room is each row for a multitude of carriers. They provide a margin of safety of operation by having a sufficient number of filled carriers available to feed the blenders, in case of a malfunction in the weighing trolley system.

The solids batching cycle consists of retrieval of an empty carrier from a storage rack by a robot, placement of the carrier in a self-propelled carrier holder on the weighing trolley, filling the carrier with precise amounts of a multitude of particulate ingredients, returning the carrier to a second storage rack by a robot, retrieval of the full carrier from said rack by a robot, placement of the carrier in a self-propelled carrier holder on the blender feed trolley, delivery of the carrier to the blender, dumping the contents into the blender, and returning the empty carrier to a storage rack via said blender feed trolley and robot. Several carriers are filled simultaneously on the weighing trolley, in order to keep up with the demand for carriers at the blenders. The exact number of carriers being filled at once is determined by the number of blenders being served by this invention, the time cycle per blender batch, and the carrier time cycle.

Feedback is provided to the recipe stored in the computer via a sample of blended product which is tested for match to a standard. The error signal is sent to the computer which converts it to a weight correction in the recipe, thus modifying the stored data base for that receipe. This correction is applied to the weighing system prior to feeding the next batch of minor ingredients into the carrier.

With regard to liquid handling, inventory control and dedicated storage are provided by tanks on electronic load cells. Liquids are batched directly to the blender machine, via a pump and a totalizing batch flow meter. This system is under control of the computer, which provides signals to the meter and pump based on the stored recipe.

The object of the present invention is to automate the inventory control, batch weighing, and delivery of a large number of minor ingredients to a batch mixing machine, thus reducing manual labor in these tasks. In this system, there is no practical limit on the number of additives which can be handled. The system is well suited for application in existing plants, where debottlenecking and labor reduction are prime targets for improvement. The present invention reduces manpower requirements via the utilization of robots and trolleys in all intermediate transfers of materials. The only manual labor used is that for loading of raw materials into the storage bins from the warehouse. After that, all additive handling is automated. Other benefits of this system are improved quality assurance due to automated weighing, reduced fugitive losses of ingredients, a cleaner operating area, and automated recipe correction. Another advantage of the present invention is to reduce the hazards to the health of workers, by elimination of manual labor in many operations where toxic or dangerous materials are handled, as in fact, many commonly used additives in the chemical industry are.

The system provides computer control of raw materials inventory. These materials are logged into the data bank upon receipt in the warehouse, and subtracted from inventory as they are consumed by operations within the plant. Reports and alarms are generated to enable management to decide upon ordering strategies, and to ensure maximum utilization of installed plant capacity, by avoiding shortages of feed materials. Keeping control of inventories of large numbers of minor ingredients is a significant problem in many existing plants. The computer control features for batching minor ingredients enables the production plant to increase the efficiency of the batch blending operation through automatic recipe selection and correction, on a large number of production lines.

BRIEF DESCRIPTION OF THE DRAWINGS

FIG. 13 thru FIG. 20 present an overall flow diagram for the additive inventory control, batching, and delivery system.

Figure 14:
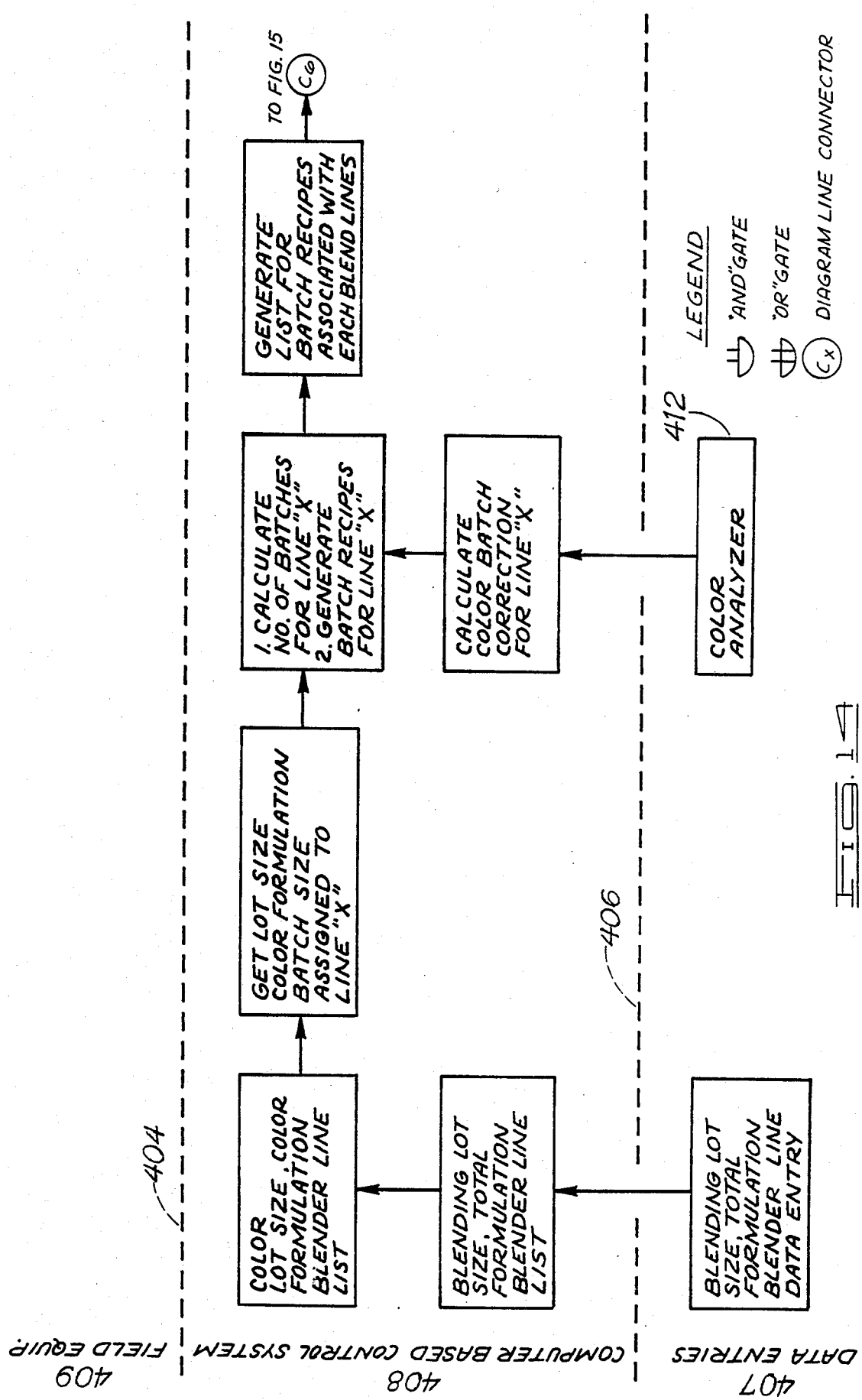
Figure 15:
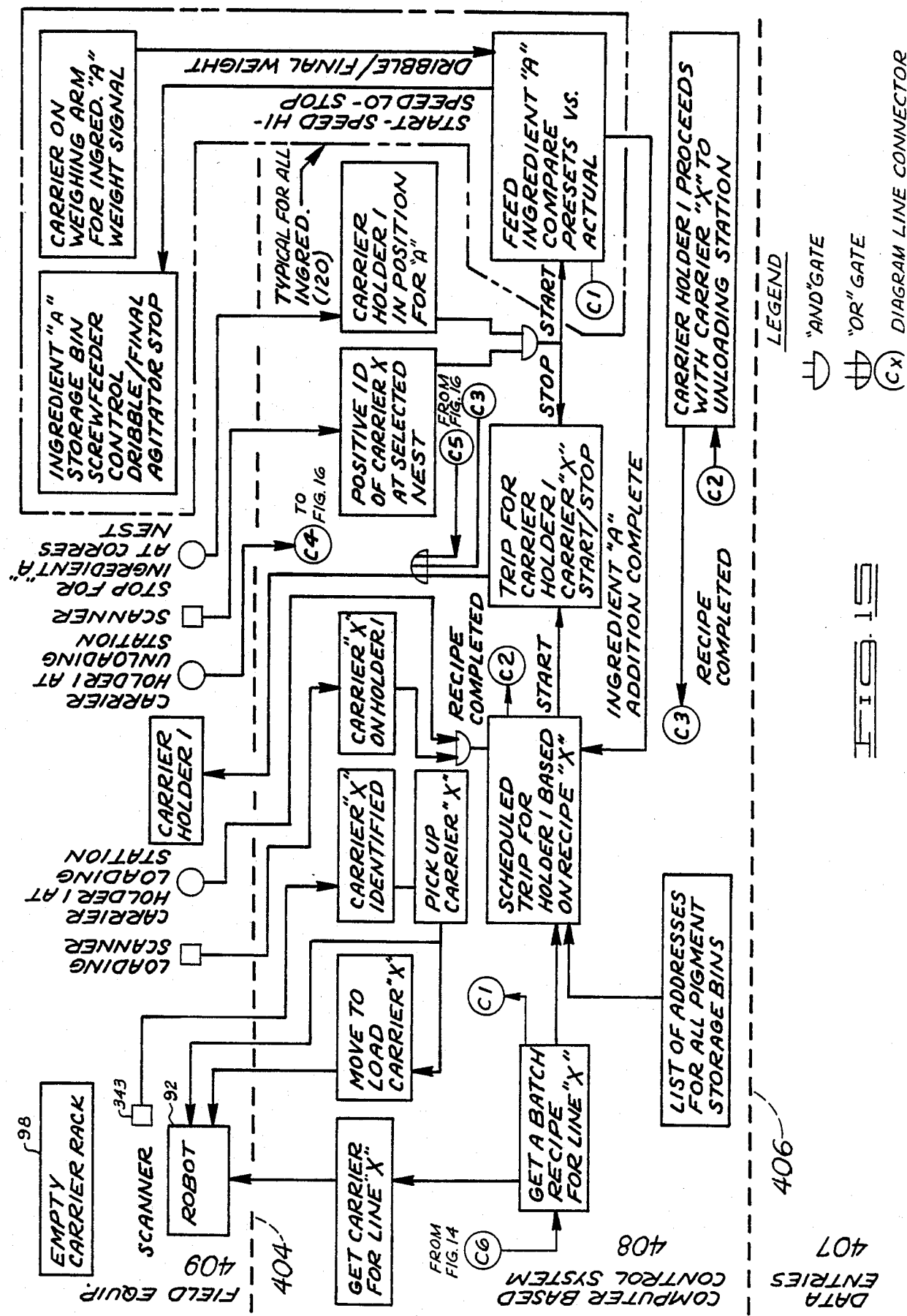
Figure 16:
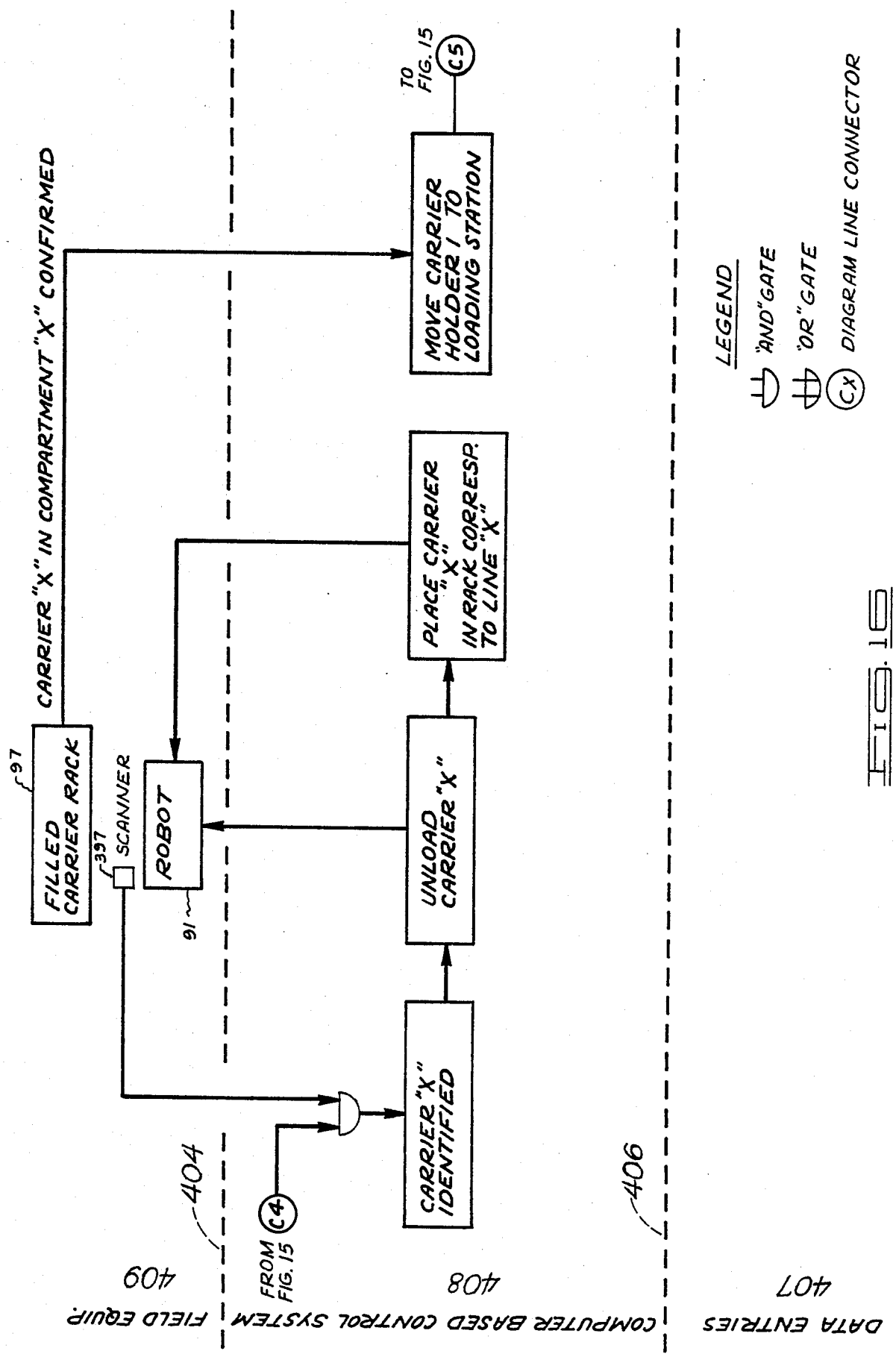
Figure 17:
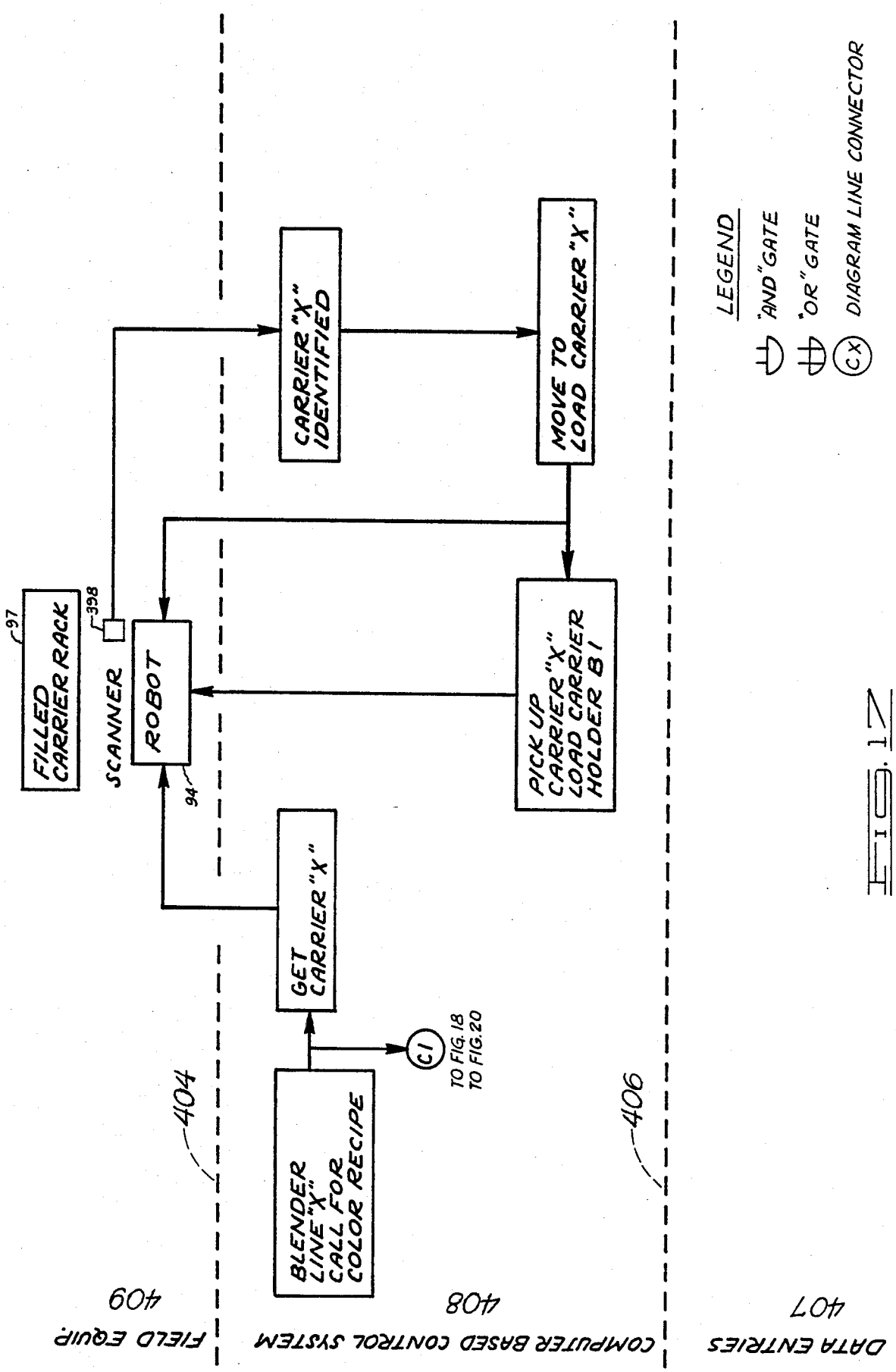
Figure 18:
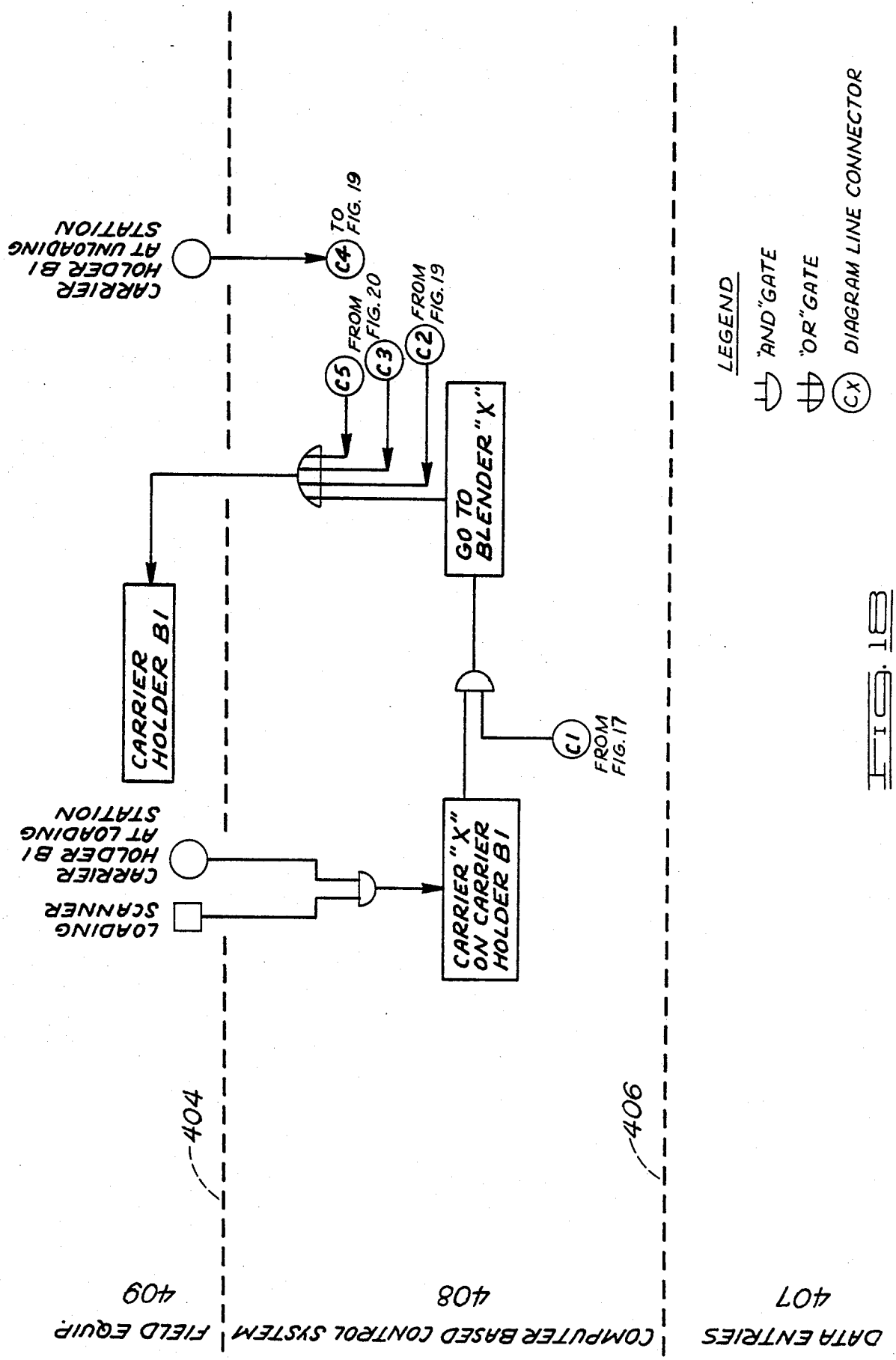
Figure 19:
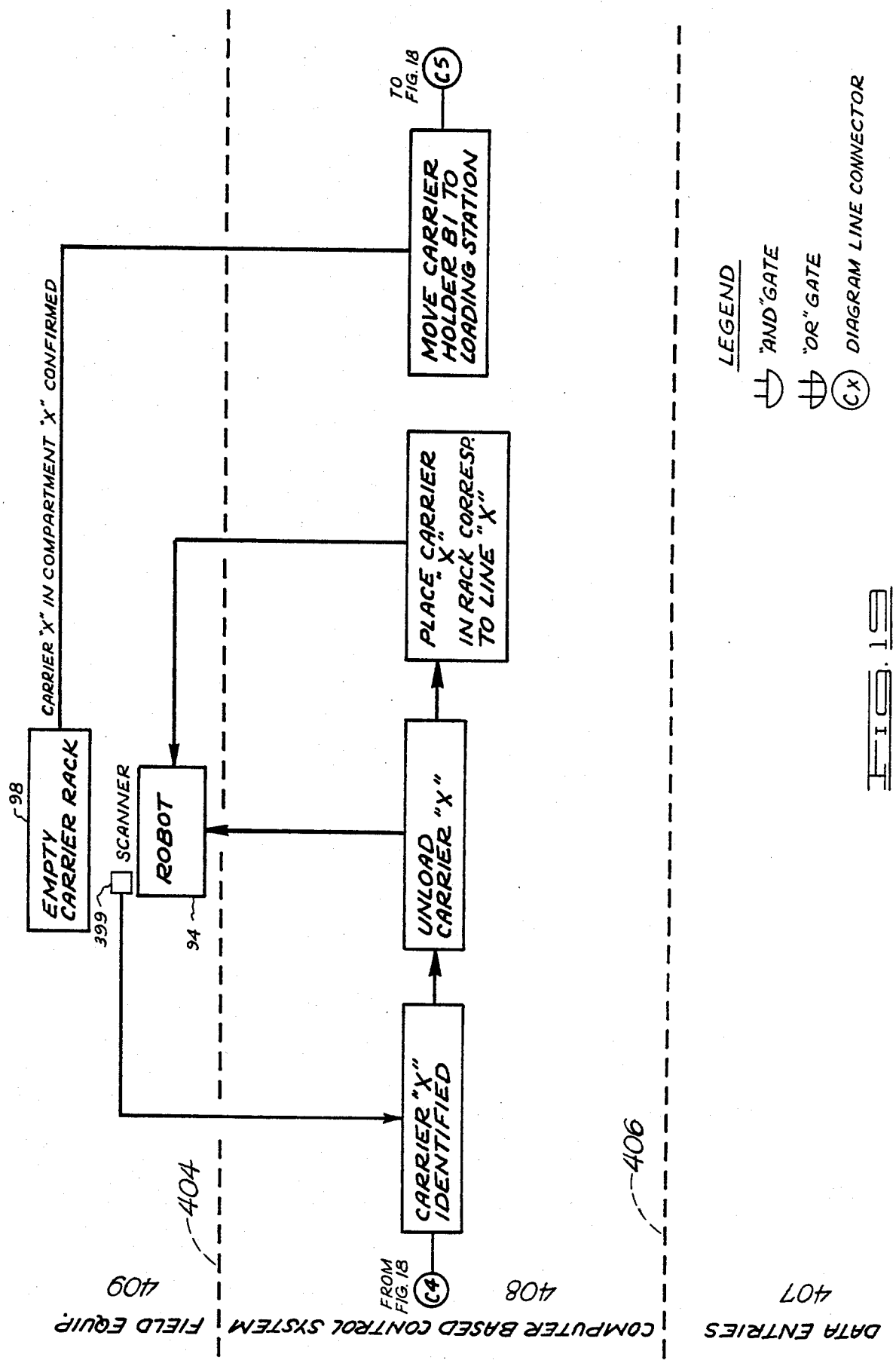

Demarcation of the source or place of action for the disclosed steps is made via phantom lines 404 and 406, thereby dividing the diagrams into three general regions: data entries 407, computer-based control system 408, and field equipment 409. The computer-based control system 408 thus receives data input information from the user and from the testing equipment, such as color analyzer 412 (see FIG. 14), and processes this information so as to control the batching and delivery of the selected ingredients to yield a desired polymer blend. The actual program of instructions to perform the steps shown in the flow diagrams is a direct result of these steps, which therefore need not be presented here in order to obtain a full understanding of the present invention's operation and implementation.

Figure 1:
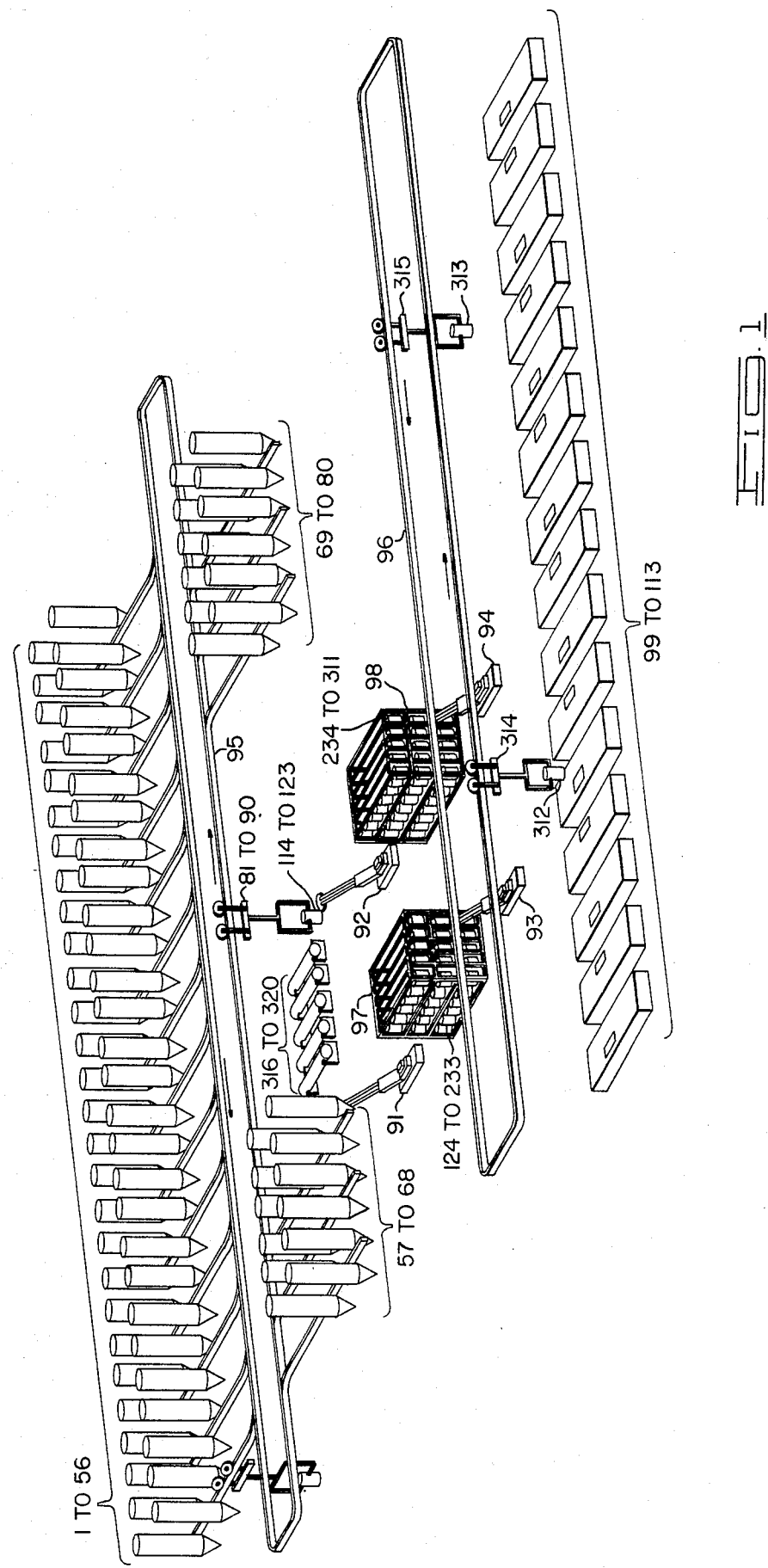
FIG. 1 is a pictorial view of the overall system of the present invention, using two trolley loops.
Figure 2:
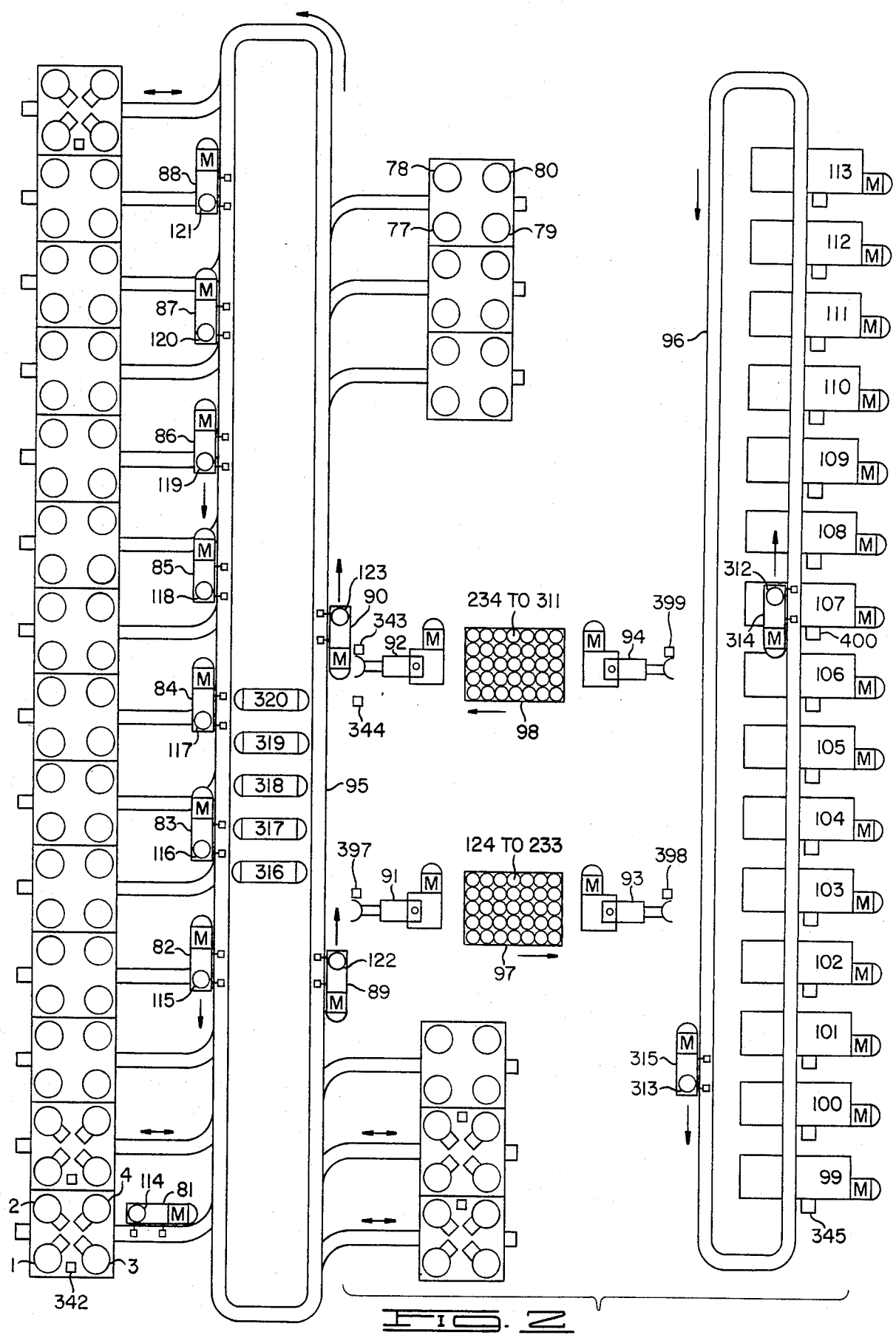
FIG. 2 is a schematic plan view of the system of FIG. 1.

Referrring now to the drawings, FIGS. 1 and 2 depict the preferred embodiment of the present invention. The storage bins 1 thru 80, and liquid tanks 316 thru 320 can vary in number, since there is one for each ingredient handled. The carriers 114 thru 311 and carrier holders 81 thru 90 can also vary in number depending upon the number of blenders 99 thru 113 which are being served, and their mixing cycle.

The present invention is generally applicable when there is a multitude of solid ingredients and several blenders. In the example shown in FIG. 1, there are eighty solid ingredients and five liquid ingredients being fed to fifteen blenders. Solid ingredients are added manually to storage bins 1 thru 80. Upon receiving a cycle start signal from the computer, a carrier is retrieved from the far side of empty carrier rack 98 by the robot 92, and placed on the fork of the carrier holder 90, which then travels via weighing trolley 95 to the storage bins 1 thru 80, where solid ingredients are added to the carrier 123, until the recipe is complete.

Figure 4:
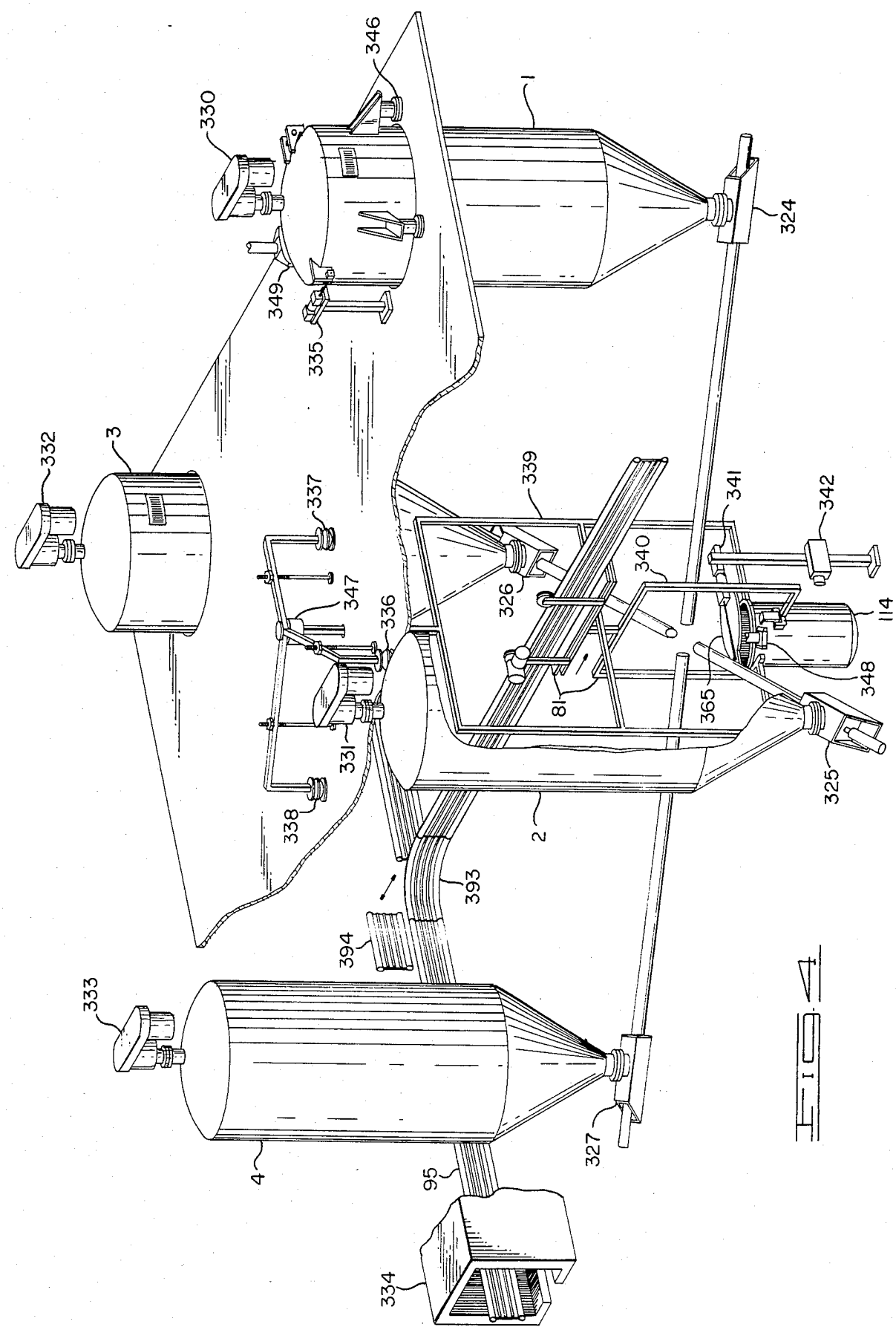
FIG. 4 is a pictorial view of the storage bin nest and weighing apparatus of the system of FIG. 1.

The storage bins 1 thru 4 are grouped in nests to save space and switching stations, as shown in FIGS. 1, 2 and 4. When the carrier holder 81 is directed into a nest, it leaves the main track of the weighing trolley 95 via a switch 393–394, to avoid blocking other carrier holders with destinations further down the track. Then, after filling the carrier, robot 91 retrieves the carrier from the carrier holder and places it in the filled carrier storage rack 97.

When solid ingredients are required at a blender, robot 93 retrieves a carrier 312 from storage rack 97 and places it on carrier holder 314 on the blender feed trolley 96. The carrier 312 is delivered to the blender 107 via the carrier holder, and after bar code verification, the batch of solids is dumped into the open blender hatch. Then the carrier is moved by the carrier holder 314 in front of robot 94 which lifts the carrier and places it in the empty carrier rack 98.

Bar code scanners are shown in FIG. 2 typically at specified locations which are at each nest of storage bins 342, e.g., on the fork of each robot 343, 397, 398, 399, at the carrier loading position 344, and at each blender 345, 400. The purpose of the scanners is to provide positive identification of the carriers during transfers, filling and dumping.

Figure 3:
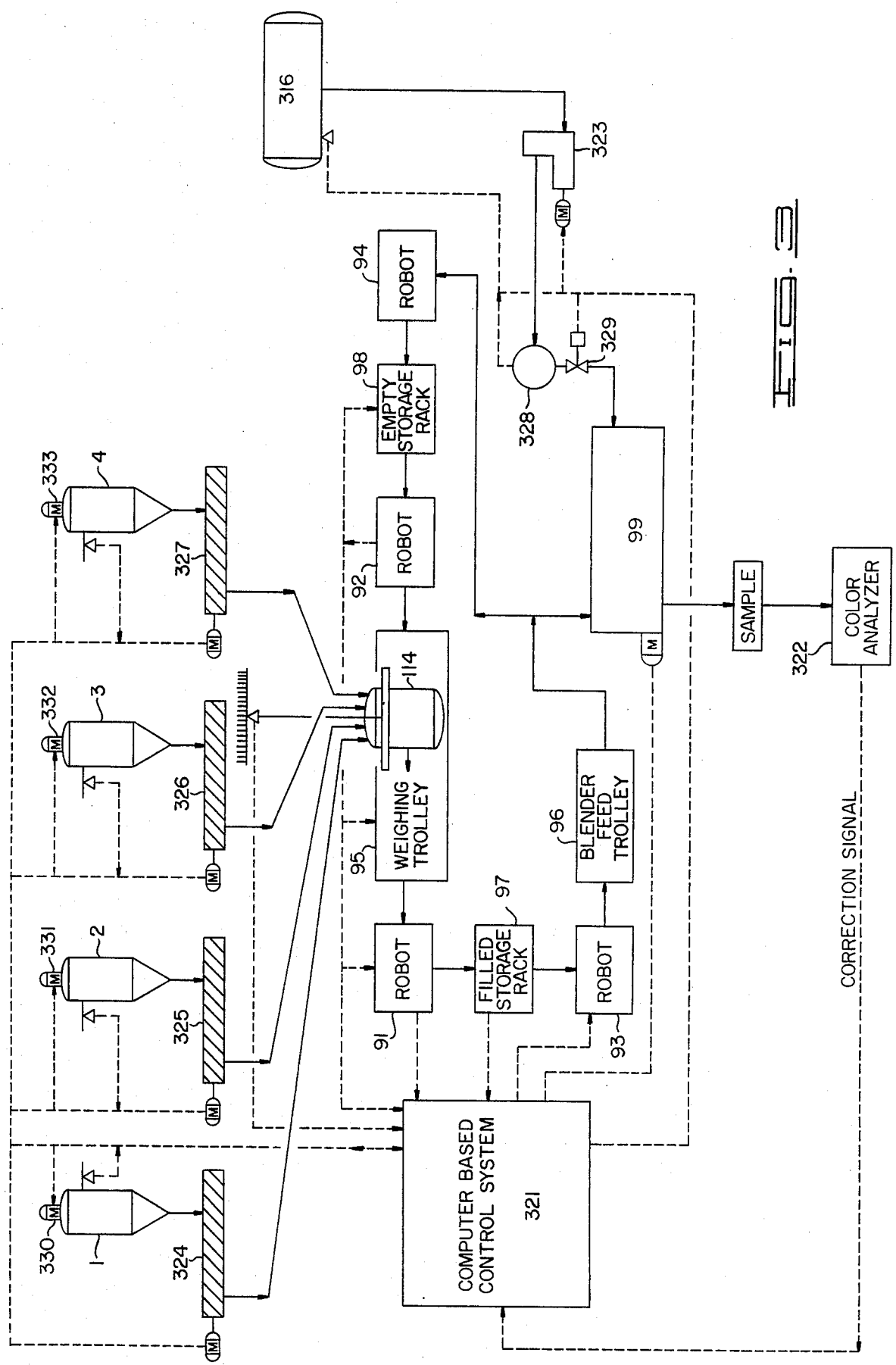
FIG. 3 is a schematic illustration showing the method of filling the carriers of the system of FIG. 1.

Referring now to FIG. 3, the paths of electrical control signals are shown schematically for a typical filling sequence for a carrier 114. The movement of the carrier 114 through its cycle as previously described is shown schematically as a loop, starting with the empty carrier storage rack 98, and ending with same. The principal control element is the computer 321. The path of a test sample from the blender 99 to the analyzer 322 is shown.

Liquids are metered batchwise via pump 323 and batch flow meter 328. The flow cutoff is achieved by valve 329. Solids are metered by screw feeders 324 thru 327 which are capable of full feed rate and dribble rate, to achieve maximum accuracy at the cutoff point.

DETAILED DESCRIPTION

Figure 5:
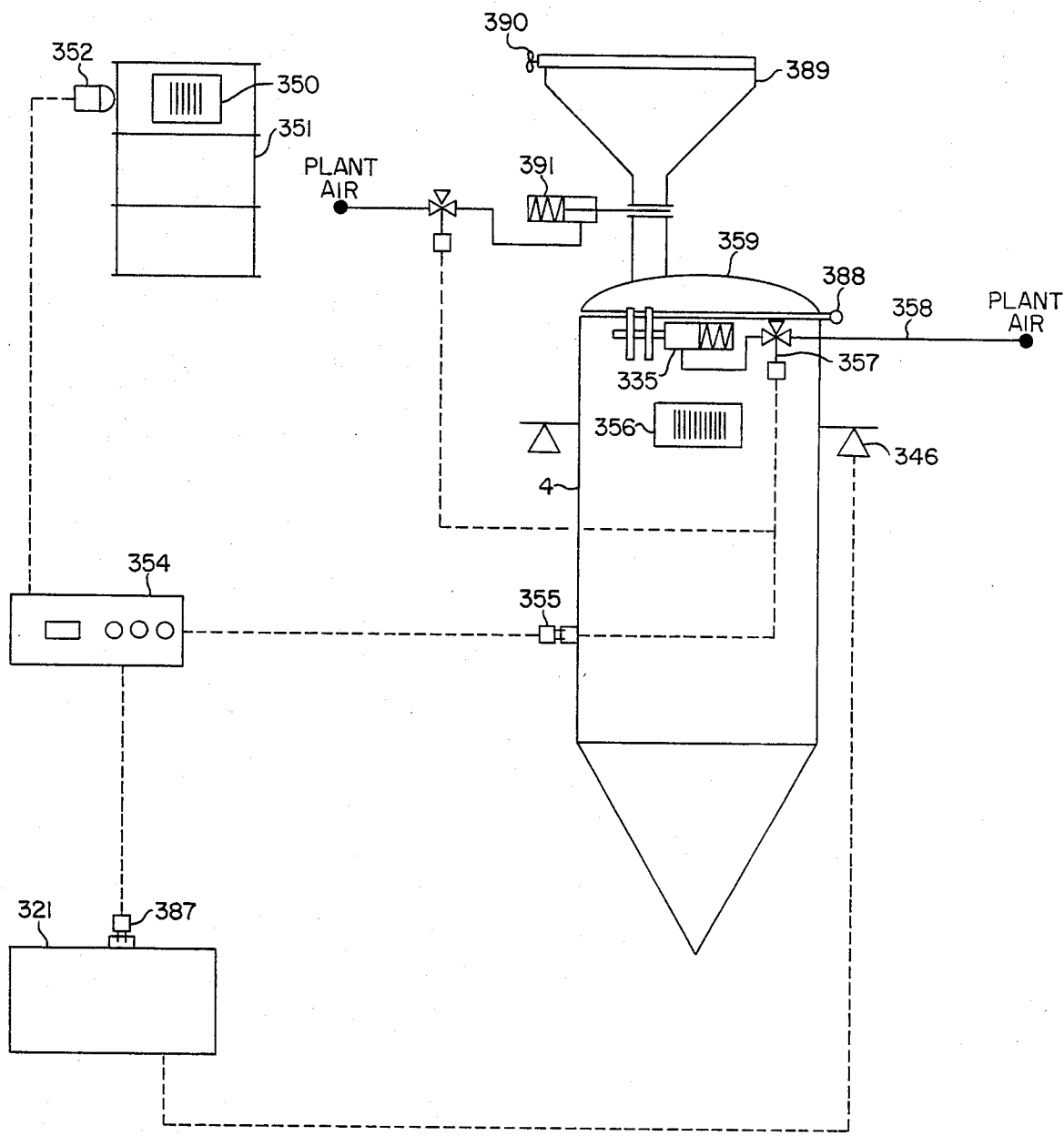
FIG. 5 is schematic view of the storage bin lock of FIG. 4.

Below, the present invention is described in detail, starting with the receipt of raw materials in a typical process plant. Referring now to FIG. 5, additives are received in fiber packs 351 or other containers in the warehouse area. A plastic coated bar code label 350 is attached to the shipping container showing net weight, name of additive, and plant code for additive. The bar code consists of wide and narrow lines and spaces similar to the type used widely in industry to transmit alphanumeric information to a digital decoder. In the warehouse, the bar code is used for inventory control check-in. When the code is read by use of the portable scanner 352 and decoder 354, an amount equal to the weight in container 151 is added to the ingredient inventory information stored in the computer 321, via a signal thru connection 387.

Figure 7:
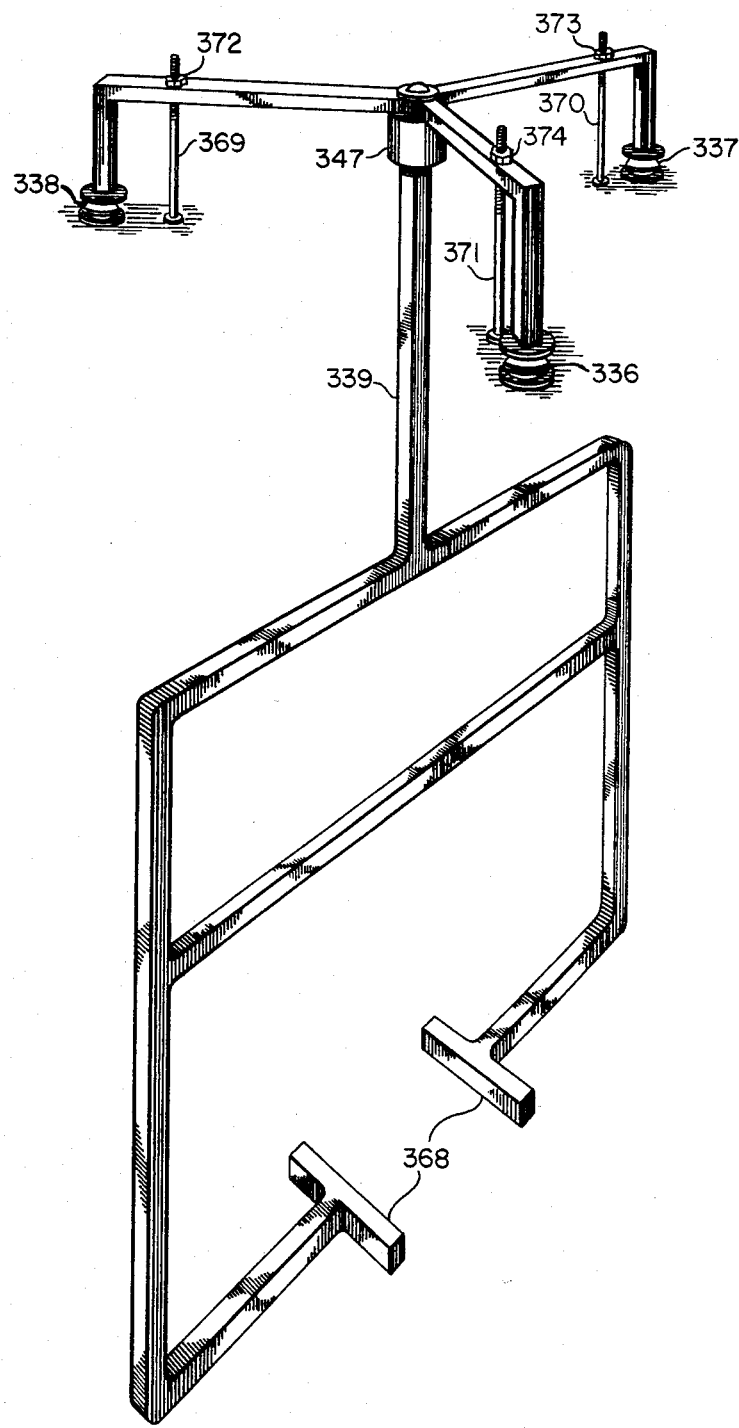
FIG. 7 is a pictorial view of the weighing arm of FIG. 4.

When material is removed from the storage bin 4, the output from carrier weighing load cell 347 of FIGS. 4 and 7 subtracts this value, to give the current ingredient inventory. The status of material weight in the storage bin at any time is given by load cell 346, FIG. 5 (typical of three per storage bin). This signal indicates when refilling is necessary.

EXAMPLE 1

The shipping container and storage bin bar code will contain the following information.

| Information Type | Coded Data On Label |
|---|---|
| Net Weight Contents (lbs) (Shipping Container only) | 999.9 |
| Name of Additive (Abrev.) | PHTHAL BLU |
| Plant Code (typical) | BB 6498 |

A second function of the portable scanner 352 is to prevent cross contamination of colors or additives when filling a storage bin 4. This is accomplished by attaching a plastic coated bar code label 356 with the name of additive and plant code onto the corresponding storage bin 4. Before additive may be transferred from the shipping container 351 to the storage bin, the portable scanner 352 is used to compare the bar code 350 on the shipping container 351 and the bar code 356 on the storage bin 4. If the name and plant codes are identical on both, thus ensuring positive identification of the contents, then a control signal will be sent via connection 355 to a dry contact closure on the pigment storage bins. This dry contact will in turn activate the solenoid valve 357 on the plant air line to the cylinder operated cover lock 335, allowing the storage bin cover 359 to be opened via hinge 388. When filling the bins with additives, a scoop may be used. Alternatively, a portable hopper cone 389 with a clamping arrangement 390 for fit-up to the shipping container may be used for adding pigments. This system provides a closed operation to avoid dust, when transferring pigments from the shipping container to the storage bin. In this case, the lock mechanism is a knife gate valve 391 on the feed port of the storage bin 4.

Referring now to FIG. 4, a nest of four storage bins 1 thru 4 are shown mounted on load cells 346, (typical of three per bin). The storage bins are generally sized to hold enough material for at least one eight hour shift of operation, which might typically be 25 cubic feet of working capacity. An agitator 330 thru 333 is provided on each storage bin for aiding the feed of particulate solids. A split clutch is provided on the agitator drive shaft to permit opening the storage bin cover without disassembly of the agitator. Below each storage bin are screw type feeders 324 thru 327, which are used for feeding particulate solids. The feeders are capable of full rate flow and dribble rate flow, which is preferably about 10% of full rate.

Figures 10, 11:
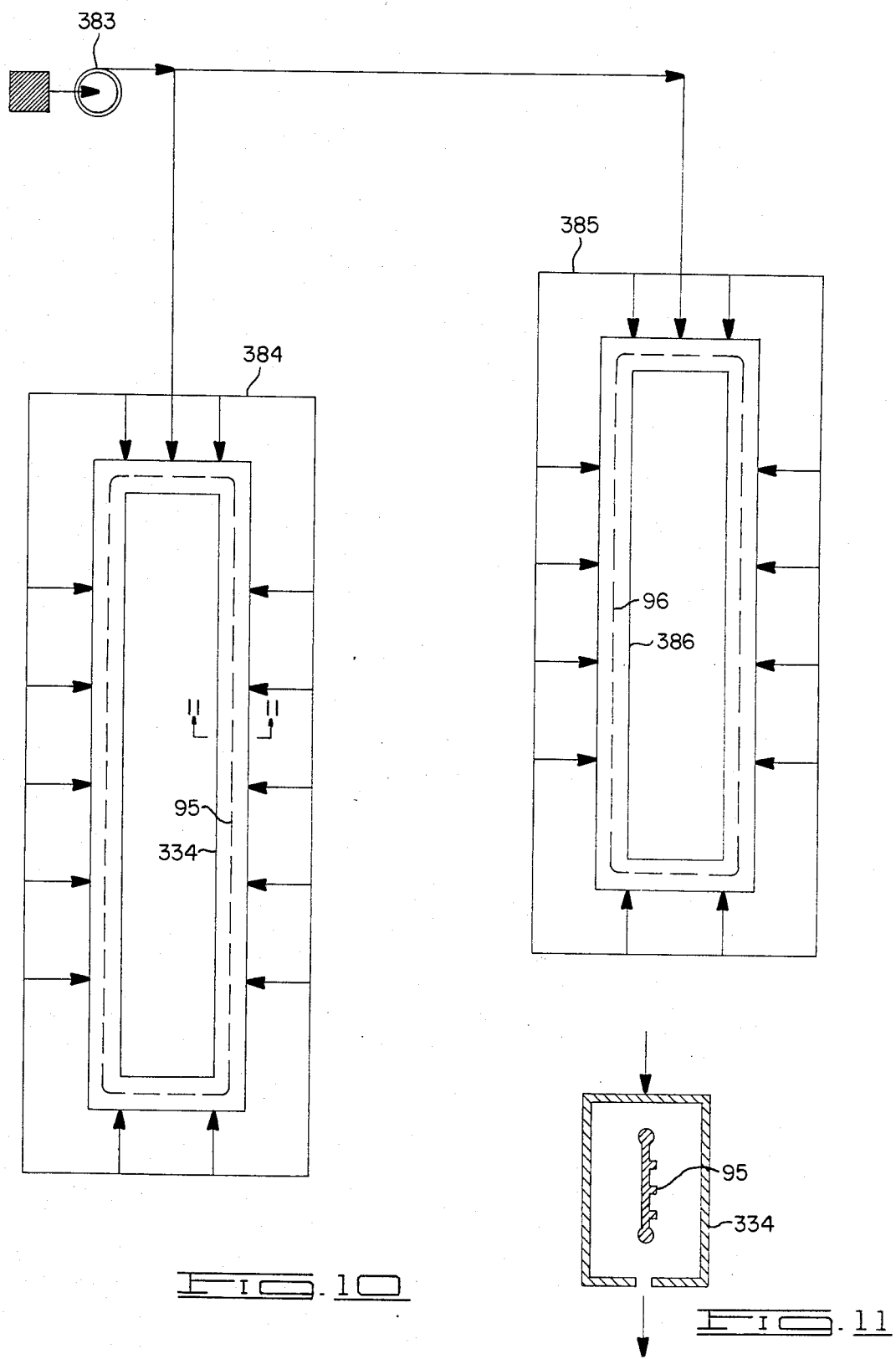
FIG. 10 is a schematic view of the dust purging system for the trolleys of FIG. 1.
FIG. 11 is a cross sectional end view of the dust enclosure.

Near the top of the carrier 114, dust control is provided by a slot type vacuum hood 348. A vacuum hood 349 (typical) is located at the top of each storage bin. Air purged dust enclosures 334 and 386 are preferably provided for the full length of weighing trolley 95 and blender feed trolley 96, as shown in FIG. 10, to eliminate the possibility of dust ignition, since each trolley uses open power bus bars with moving brush contacts, which can produce arcing.

Referring now to FIG. 2, the schematic plan view of the present invention is shown. The operation of filling a carrier 123 with solids starts when robot 92 which serves the empty carrier rack 98 receives a signal from the computer 321 to select an empty carrier from the empty carrier track. The empty carrier rack has room to store 15 rows of 8 carriers, for a total of 120 locations. This rack provides buffer storage for feeding empty carriers 234 thru 311 to weighing trolley 95. For each blender, the computer stores a preselected recipe for making up the desired batch of additives into the carrier.

A label, with a bar-coded, optically detectable blender line number is permanently attached to each carrier for identification. One set of carriers is dedicated to each blender line to avoid contamination. They are washed out at the end of a production run. The bar code scanner used in the weighing trolley system is the fixed beam, medium range type. It is also used in the operation of the blender feed trolley, and on the gripping hand tooling of the robots. A fixed beam scanner is applicable for these locations, because the required motion for reading the bar code is supplied by either the robots or the trolleys. A bar code scanner is used to verify the blender line number on the carrier in various places, as follows:

When robot 92 picks up an empty carrier from the empty carrier storage rack 98, via scanner 343 at the end of the robot arm.

Before robot 92 places an empty carrier in the carrier holder 90 on the weighing trolley 95, via loading scanner 344.

When carrier 114 reaches a nest of storage bins 1 thru 4, which are part of recipe, via scanner 342 located in each nest.

When robot 91 picks up a filled carrier 122 from a carrier holder 89 on the weighing trolley 95, via scanner 397.

When robot 93 picks up a filled carrier from storage rack 97, via scanner 398.

When a filled carrier 312 on the blender feed trolley reaches the destination blender 107, via scanner 400.

When an empty carrier on the blender feed trolley reaches robot 94 serving the empty carrier rack 98, via scanner 399.

EXAMPLE 2

The carrier bar code will contain the following information:

| Information Type | Coded Value |
| --- | --- |
| Blender Line Number | A 101 |

Bar code scanner locations are summarized in the table below.

TABLE I

| Location | No. of Scanners |
| --- | --- |
| Loading Scanner | 1 |
| Storage bin Nests | 20 |
| Blenders | 15 |
| Robots | 4 |
| TOTAL | 40 |

All bar code labels are plastic coated, for maximum durability.

Now, continuing in FIG. 2 with the description of filling the carrier, when robot 92 places carrier 123 in the carrier holder 90, a signal is sent to the computer, via the loading scanner 344, identifying its line number. The batch formulation recipe is now tied to the carrier holder number in the computer via the line number. The computer can now control the movement of the self-propelled carrier holder 90, with respect to which nest of storage bins the carrier holder must stop at, according to the recipe required for a particular line. The position of each carrier as it travels along the weighing trolley is signalled by limit switches, and logged on a computer map continuously for all carrier holders on the trolley. A signal from the computer is used to start/-stop the carrier holder motor, as required. After the carrier is placed in the holder by the robot, the holder motor receives a signal from the computer to start down the weighing trolley track 95 at 4 ft/sec. The track 95 runs past 20 nests of 4 pigment storage bins each. As the carrier holder 81 passes a nest of storage bins 1 thru 4 which are part of the recipe, it is switched to a side rail spur, using the switch rail 393, 394 of FIG. 4. Bar code scanner 342 verifies the blender line number on the carrier 114. When the carrier holder 81 is in position in front of pneumatic cylinder operated mechanical arm 341, a limit switch stops the carrier holder drive motor. The spur 403 is provided to avoid delays which might occur when one carrier is being filled, and a second carrier must go to a nest further down the track. A carrier may return to a bypassed nest, on a repeat trip around the track, until the formulation is complete. In this example, ten carriers can be on weighing trolley 95 at the same time.

Figure 6:
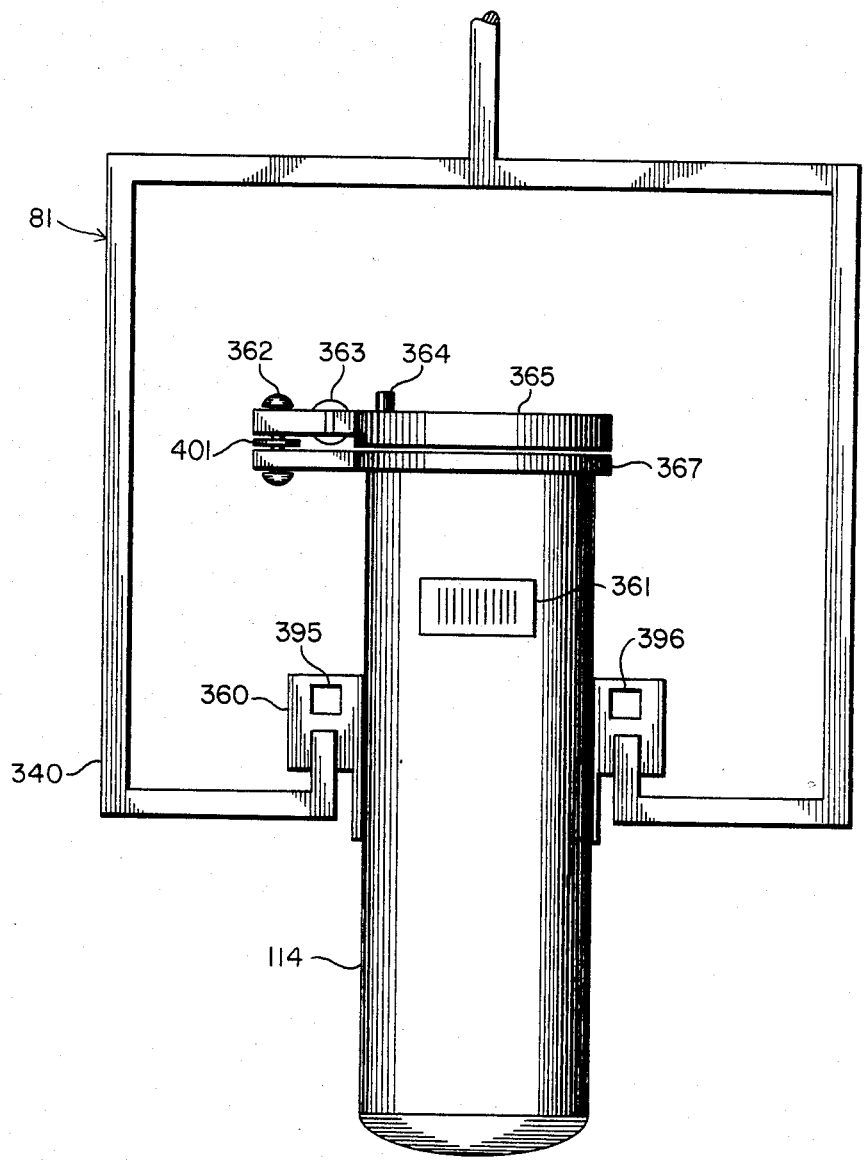
FIG. 6 is a side view of the carrier and holder arm of FIG. 4.

The carrier 114 of FIG. 6, in this example, is 14 inches in diameter × 32 inches long and weighs 33 pounds. It is sized to hold one batch of additives to be added to the blender. The usual material of construction is 1/16″ thick stainless steel. The thin wall provides a low tare weight, which is an advantage related to accuracy in the weighing operation. The carrier 114 has a cover 365 which can pivot on pin 362 in the horizontal direction, and swing open on hinge 363 in the vertical direction. A spring loaded friction washer 401 keeps the pivoted cover in the last position. The cover is provided on the carrier to prevent foreign materials from contaminating the batch, as it travels on the weighing trolley and when in the storage racks. After the carrier holder has stopped in a nest of storage bins, a cylinder operated mechanical arm 341 will engage pin 364 and slide the pivoted cover open. During this operation, the carrier 114 is held by the arm 340 of the carrier holder 81, whose lower fork engages the carrier lug 360, from below, keeping the carrier firmly in place in the horizontal plane.

Then the carrier holder 81 moves forward toward light weight weighing arm 339 of FIGS. 4 and 7, whose fork 368 engages the underside of the upper flange 367 of the carrier 114. The weighing arm 339 is suspended from tension load cell 347. Air mounts 336, 337, 338 are inflated with compressed air, which lift the weighing arm and carrier vertically, with the three radial arms coming to rest against adjustable stop nuts 372, 373, 374. These nuts are provided to align arm 339 in an exact vertical plane, for weighing accuracy. In this position, the carrier 114 and light weight weighing arm 339 are solely suspended from stationary load cell 347. This arrangement makes the weighing system stationary, and avoids moving brush contacts for the weight signals, which can introduce substantial errors due to variable electrical resistance of the contacts. It also reduces the tare weight of the system, which increases accuracy. Now, the weighing-in operation can begin.

Referring now to FIG. 4, each screw feeder 324 thru 327 is provided with a discharge gate, one of which will open. Then the screw feeder will deliver the additive to the carrier. The screw feeders feed material at fast and dribble speeds into the carrier, based upon the load cell 347 signal, and stored recipe information in the computer. At set weight for each ingredient the discharge gate closes and the screw feeder stops. For calibration and emergency use, local batch weight switches and indicators are provided, plus a cycle-start pushbutton for each ingredient. After all ingredients have been added, the carrier is lowered on to the carrier holder arm 340 by depressurizing the air mounts, at the same time releasing the carrier from the weighing arm fork 368. Then the carrier holder 81 will move in front of pneumatic cylinder operated arm 341, which will close the lid. The carrier holder will then receive a signal to start moving back down the spur onto the main weighing trolley track, on its way to the next nest of storage bins, as required by the recipe. The process of weighing is repeated as above, until all ingredients have been added to the carrier. Then, the carrier is moved to a position in front of robot 91 of FIG. 2 which services the filled carrier storage rack 97. Robot 91 will lift the carrier out of the carrier holder, and place it in the rack, in a specific position, in accordance with the line number.

Figure 8:
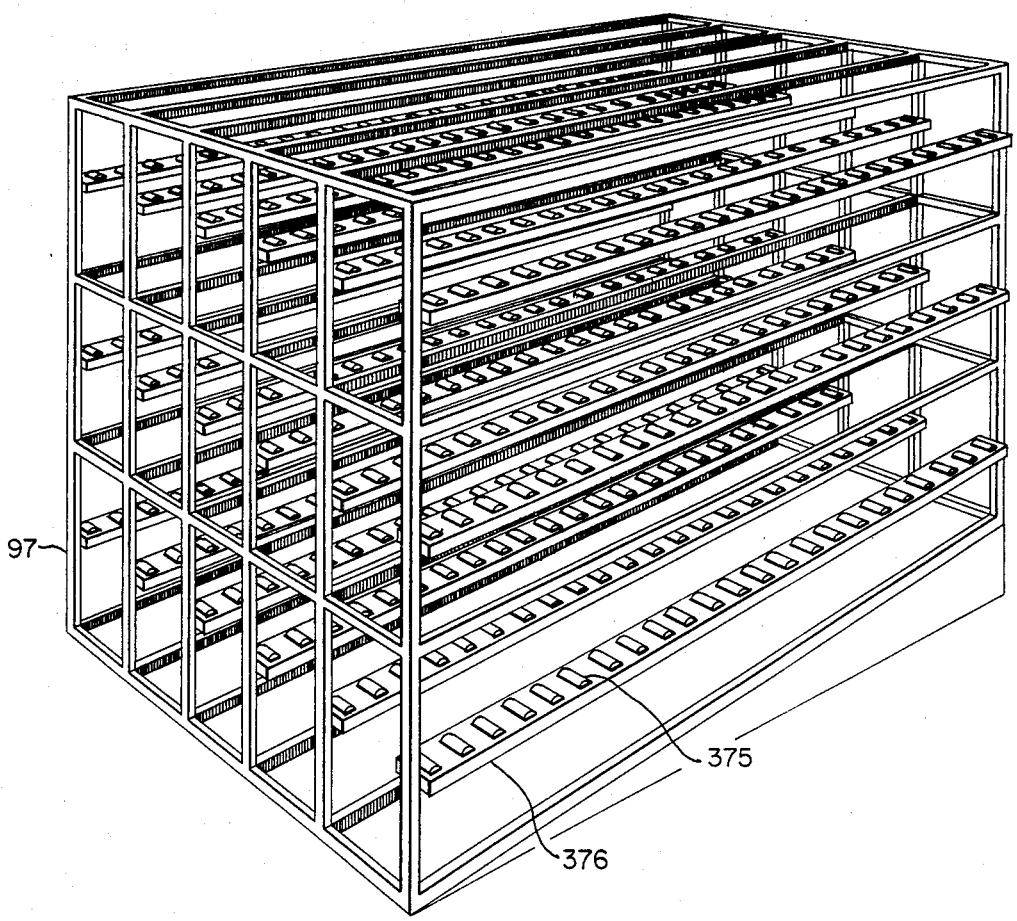
FIG. 8 is a pictorial view of the storage rack of FIG. 1.

Referring now to FIG. 8, filled carrier storage rack 97 has fifteen row of components, corresponding to the number of blender lines being fed by the present invention. Each row has room for eight carriers which are engaged on roller tracks 375 and 376 via the lower face of lug 360, on the carrier 114. The lug length is designed to engage three rollers at once, for stability.

Referring to FIG. 2, when the robot 91 releases the carrier, it will roll via gravity toward the opposite end of the row, so as to feed itself to robot 93. Carrier storage rack 98 is similar in design, but it feeds carriers from robot 94 to robot 92, by gravity roller.

Figure 12:
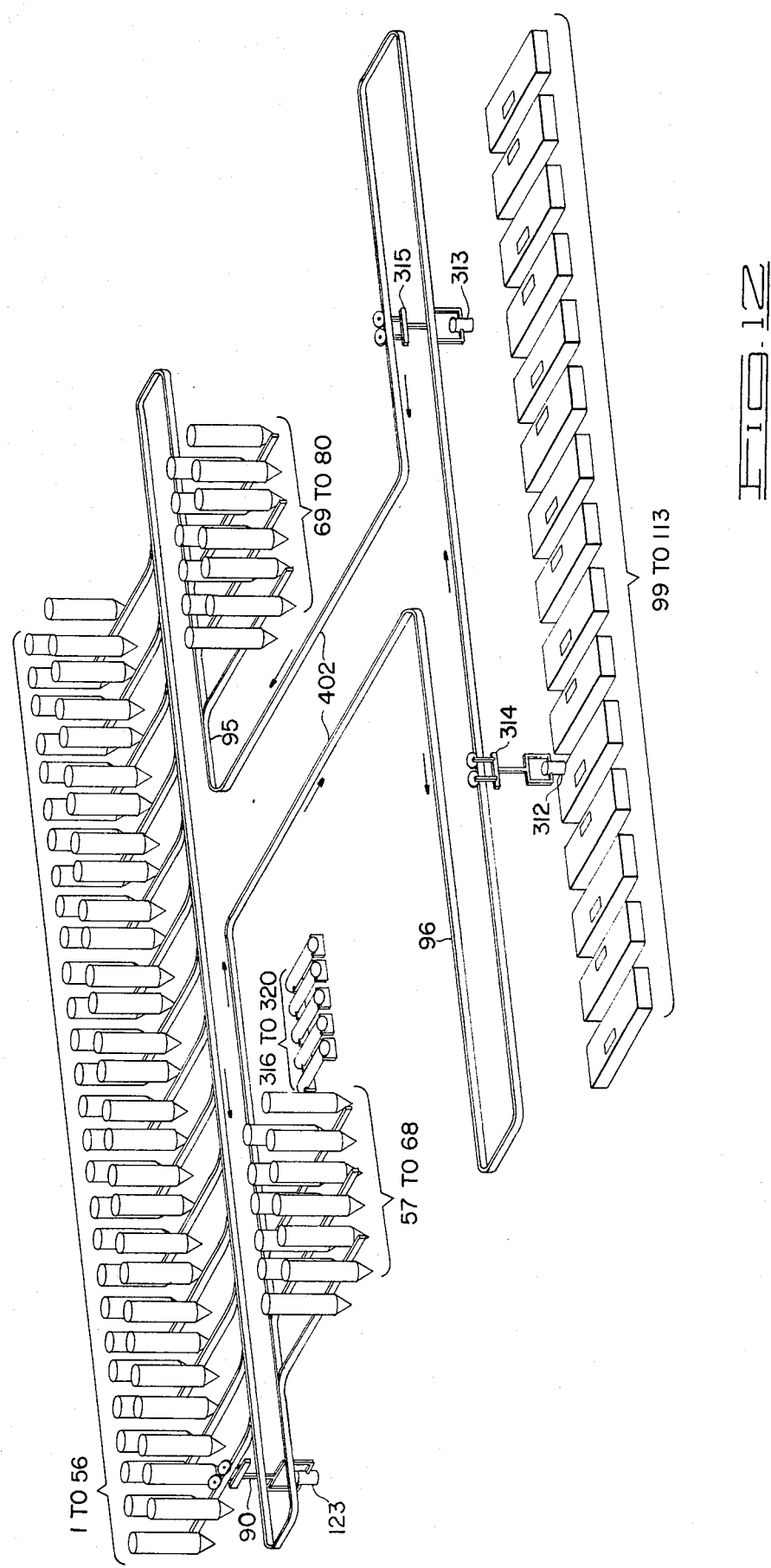
FIG. 12 is a pictorial view of a different embodiment of the present invention, using only one trolley loop.
Figure 13:
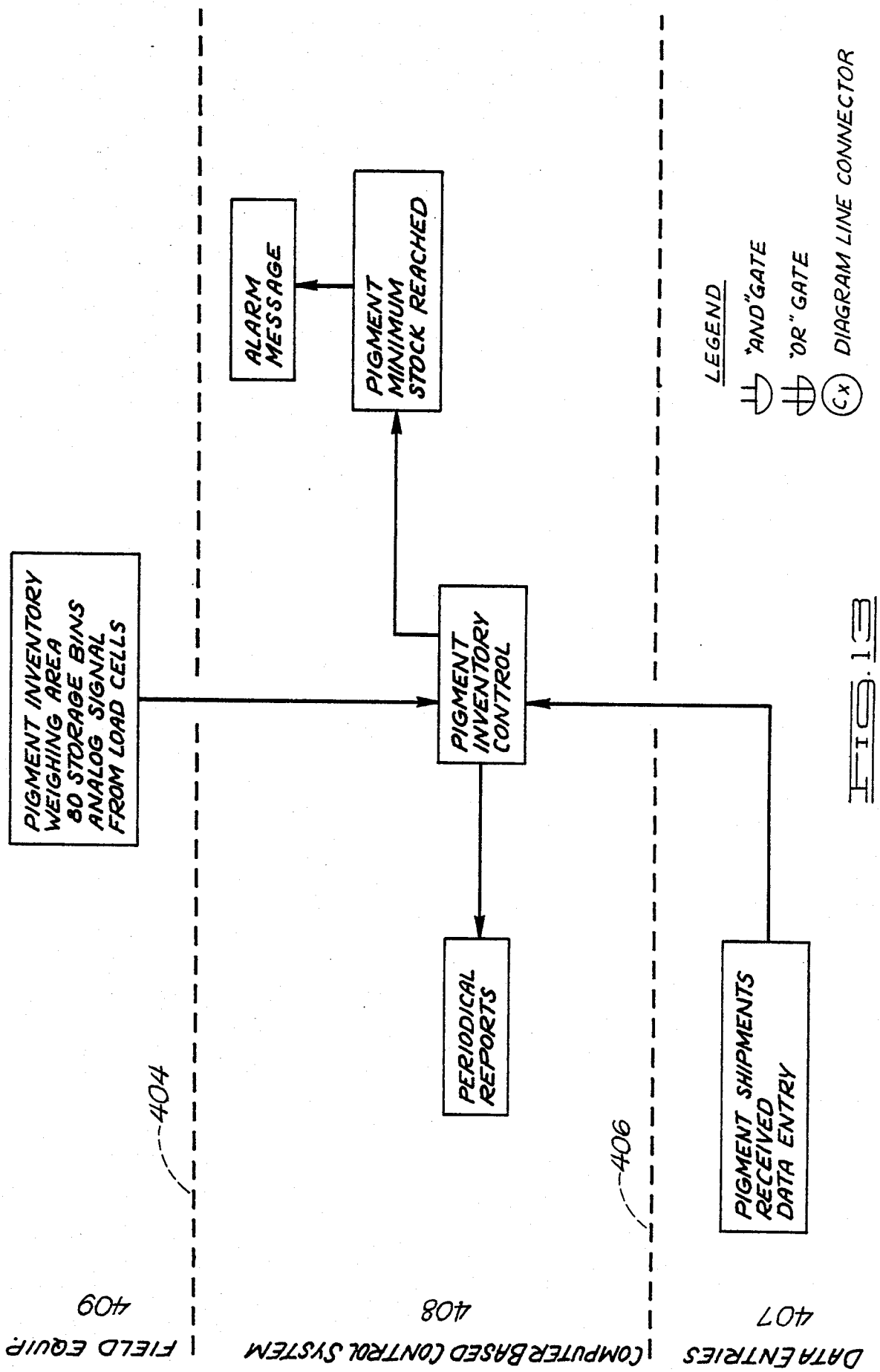

In an alternate embodiment of the present invention, the robots and storage racks are eliminated, and carrier 123 remains on carrier holder 90. The weighing trolley 95 and blender feed trolley 96 are permanently interconnected by bridging track segments 402, to make a single compelte loop. This arrangement is shown in FIG. 12. In this embodiment the load limitation of approximately 400 lbs per batch, due to the robot, is removed. However, the buffering effect of the storage racks is lost.

Referring now to the preferred embodiment of FIG. 2, the next step is the delivery of the additive batch, which is now stored in the carrier, to a blender, 99 thru 113. During the blender cycle, a signal is received from the computer to deliver a batch of additives. Robot 93 moves to the required position at the filled carrier rack 97, identifies by bar code scanner 398 the carrier line number, picks up a carrier and loads it onto a carrier holder. The hatch on the blender is opened automatically. The carrier holder moves on the blender feed trolley 96 to the destination blender 107. When the carrier holder reaches the blender, the bar code is checked by scanner 400, and it stops. The carrier holder is lowered into the hatch, and is rotated 180°. The lid on the carrier opens by gravity, and the additives drop into the blender, assisted by a mechanical vibrator on the holder arm, to ensure complete discharge.

The complete carrier cycle time starting with retrieval of a carrier from empty storage rack through the weighing trolley and to delivery to the blender is approximately 24 minutes. After dumping the batch into the blender, the empty carrier is raised out of the hatch and rotated upright 180°. It then continues on the blender feed trolley 96 to the empty carrier rack 98, where the carrier holder stops. Robot 94 picks up the carrier from the carrier holder and places it in the empty carrier rack 98 in the correct position according to is line number, based on the bar code scanner 400. On the blender feed trolley, only one carrier holder is moving at a given time to a destination blender.

A typical time cycle for the system of the present invention follows:

EXAMPLE 3

| | MINS. SECS. |
|---|---|
| Robot 92 picks up an empty carrier from the rack 98 and places it in the carrier holder 90 | 00:30 |
| Carrier travels down weighing trolley 95. Travel time on track 360 ft/4 ft/sec | 1:30 |
| At various locations carrier holder enters spur at slow speed 150 ft/1 ft/sec | 2:30 |
| Carrier lid 365 is opened at each location (10 = | 2:30 |

-continued

| | MINS. SECS. |
|---|---|
| places for example) | |
| Carrier is moved onto weighing fork 339 (10 = places for example) and lifted by air mounts 336 thru 338 | 0:50 |
| Fast fill 90% × 37 lbs/10 lbs/min = | 3:18 |
| Dribble 10% × 37 lbs/1 lb/min = | 3:42 |
| (This fill time may be divided into as many segments as the recipe calls for) | |
| Carrier is lower by air mounts onto carrier holder arm 340 | 00:50 |
| Carrier holder moves to position, and arm 341 closes lid | 2:30 |
| Carrier moves back off spur at slow speed = 150 ft/1 ft/sec | 2:30 |
| Robot 91 picks up filled carrier and places it in the filled container storage rack 97 | 00:30 |
| Robot #93 picks up a carrier from the filled carrier storage rack, and places it on the blender feed trolley | 00:30 |
| The carrier is conveyed to the destination blender, 320 ft/4 ft/sec | 1:20 |
| The trolley mechanism inverts the carrier, dumps the contents into the blender, and returns the carrier to upright position. | 0:30 |
| Carrier holder returns to empty storage rack 60 ft/4 ft/sec | 0:15 |
| Robot 94 returns empty carrier to rack 98 = | 0:30 |
| Total time | 24:15 |

Figure 9:
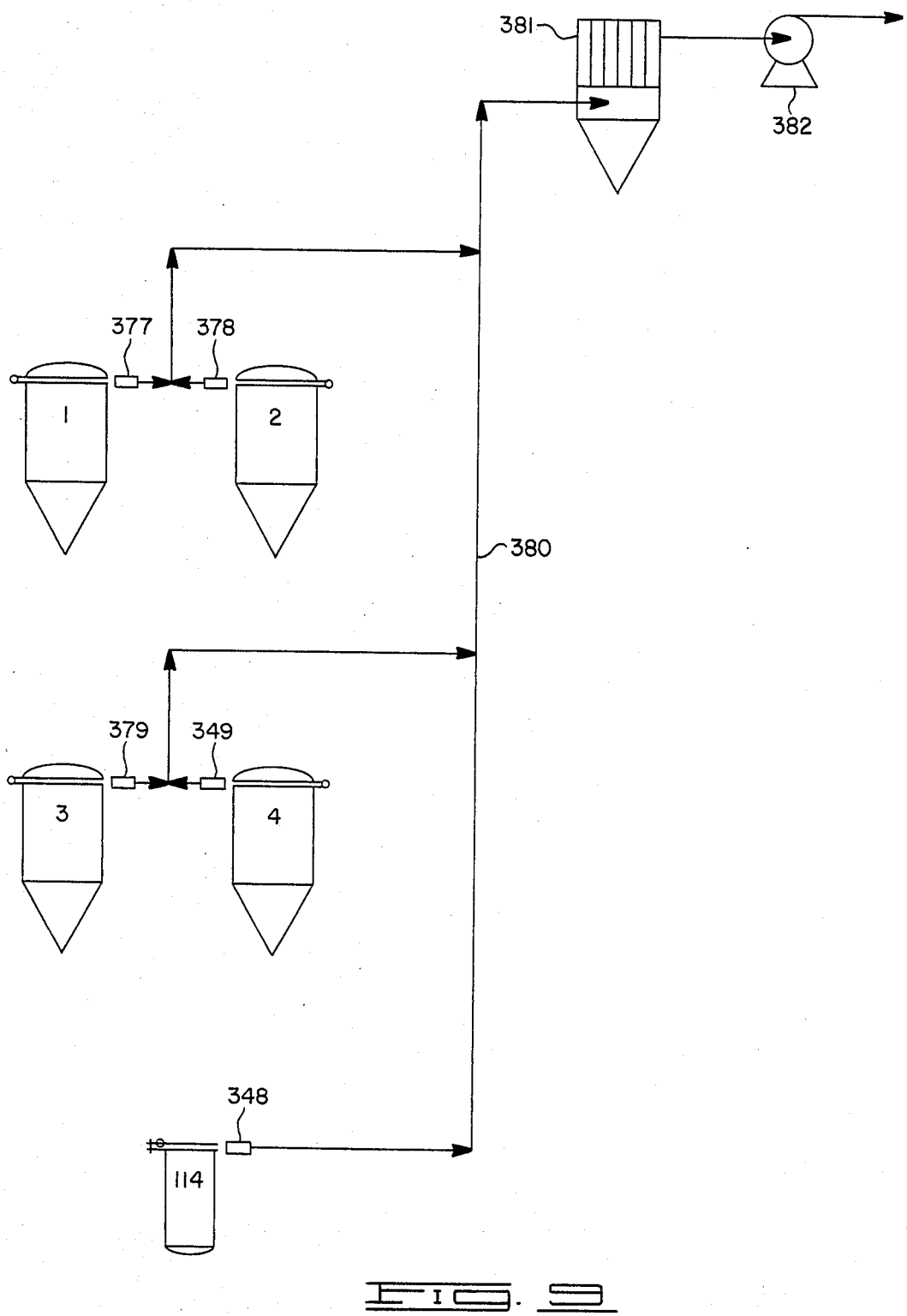
FIG. 9 is a schematic view of the dust collection system of FIG. 4.

Referring now to FIG. 9, dust hood 348 is shown near the top lid of carrier 114. Its purpose is to scavenge dust which might otherwise escape into the environment, while the carrier is being filled. Dust hoods 349, 377, 378, 379, serve a similar purpose when storage bins 1 thru 4 are being filled with additives. Blower 382 draws ambient air through the aforementioned hoods, duct system 380 and bag filter 381.

Refering to FIG. 10, air purged dust enclosures 334 and 386 are provided for the weighing trolley 95 and the blender feed trolley 96. Air is supplied by blower 383 through ducts 384 and 385 to several places along the enclosures. Purge air is expelled from the enclosure via a slot at the bottom as shown in section AA. The purpose of the enclosures is to prevent the accumulation of dust in the vicinity of the electrical bus bars on the trolley systems, thus avoiding the potential for fires.

We claim:

1. Apparatus for storing, dispensing, weighing, conveying and charging predetermined quantities of particulate solid ingredients selected from a plurality of different particulate solid ingredients into a plurality of batch blenders arrayed in a blending zone, comprising
   a plurality of particulate solid storage bins arrayed in a storage zone, each provided with a dispensing portal opened and closed by external "open" and "close" dispensing control signals,
   a trolley conveyor track extending beneath the dispensing portals in the storage zone and above the batch blenders in the blending zone,
   a plurality of carriers adapted for carrying batches of particulate solids, each having code indicia displayed thereon,
   a plurality of carrier holders, each movably engaged on the trolley conveyor track for travelling delivery of a carrier between the dispensing portals and the batch blenders,
   carrier holder moving means for propelling each holder along the track or stopping its movement in response to received "start" and "stop" signals, weighing means in the storage zone positioned to support a carrier while particulate solid ingredients are loaded therein through each dispensing portal, the weighing means producing a signal corresponding to the weight for the carrier and ingredients loaded therein, means at predetermined locations for reading the code indicia on each carrier, and a computer control system for receipt and execution of batch mixing receipt programs that prescribe the weights of selected ingredients, the computer control system having means responsive to the outputs of the code indicia reading means and of the weighing means, so as to produce said "start" and "stop" signals controlling the travel of one or more carrier holders for causing a carrier holder to move a carrier into juxtaposition with the dispensing portals of selected storage bins, wherein the computer control system produces said "open" dispensing control signals to dispense the selected ingredients into the carrier and so that the "close" dispensing control signal is generated when the weighing means signal reaches a value corresponding to the recipe prescribed weight for the selected ingredient, and further wherein said "start" and "stop" signals cause the carrier holder to move into juxtaposition with a selected blender after the desired ingredients have been loaded from the storage bins, so as to generate a dumping signal to cause the carrier holder to empty the contents of the carrier into the selected blender.

2. The apparatus defined in claim 1, wherein the trolley conveyor track is formed as a closed loop providing a continuous path for recycling each carrier in turn.

3. The apparatus defined in claim 1, wherein the trolley conveyor track is divided into two independent segments, a weighing trolley extending beneath the dispensing portals in the weighing zone and a blender trolley extending above the blenders in the blending zone, and further including filled carrier storage-transport means positioned to receive filled carriers from the weighing trolley for storage and subsequent loading on the blender trolley, and empty carrier return means positioned for returning carriers from the blending trolley to the weighing trolley.

4. The apparatus defined in claim 3, wherein both segments of the trolley conveyor track are formed as closed loops.

5. The apparatus defined in claim 3, wherein the filled carrier storage-transport means include a plurality of filled carrier storage racks positioned between the independent conveyor track segments, a filled carrier receiving robot positioned to receive filled carriers arriving on the weighing trolley and to transfer them to a storage rack, and a filled carrier delivery robot positioned to take filled carriers from the storage rack and to deliver them to the blender trolley.

6. The apparatus defined in claim 5, wherein the empty carrier return means includes empty carrier storage-transport means positioned to receive empty carriers from the blender trolley for storage and subsequent loading on the weighing trolley.

7. The apparatus defined in claim 6, wherein the empty carrier storage-transport means includes a plurality of empty carrier storage compartments positioned between the blender trolley and the weighing trolley, an empty carrier receiving robot positioned to receive empty carriers arriving on the blender trolley and to transfer them to a storage compartment, and an empty carrier delivery robot positioned to take empty carriers from the storage compartment and to deliver them to the weighing trolley.

8. The apparatus defined in claim 1, wherein the particulate solid storage bins are arrayed in groups with their dispensing portals juxtaposed at a plurality of carrier loading stations, each provided with a side rail spur switchably joined to the trolley conveyor track.

9. The apparatus defined in claim 8, wherein each group comprises four bins, each connected by a conveying delivery conduit to its respective juxtaposed delivery portal.

10. The apparatus defined in claim 8, wherein the trolley conveyor track is provided with a separate switchable side track extending under the dispensing portals of at least one group of arrayed storage bins.

11. The apparatus defined in claim 1, wherein each storage bin is provided with a filling port normally closed by a retractable cover, with locking means maintaining closed cover in its normally closed position, cooperatively connected to unlocking means actuated by a scanner in response to presentation of a bar code label on a raw material container corresponding to a bar code label on the storage bin.

12. The apparatus defined in claim 1, wherein each carrier is provided with a normally closed retractable lid cooperatively alignable with first retracting means adjacent to each storage bin dispensing portal, and with second retracting means adjacent to each blender, whereby movement of the carrier in its carrier holder under the dispensing portal automatically retracts the carrier lid for filling, and movement of the carrier in its carrier holder over the preselected blender automatically retracts the carrier lid for emptying the carrier into the blender.

13. The apparatus defined in claim 12, wherein each carrier lid is pivotally mounted for retracting movement pivoting about two different axes, one for filling and the other for emptying.

14. The apparatus defined in claim 1, wherein dust intake vents connected to exhaust blowers via dust-entrapping screens are positioned adjacent to each storage bin dispensing portal, and to means for filling ports in each storage bin.

15. The apparatus defined in claim 1, wherein dust intake vents connected to exhaust blowers via dust-entrapping screens are positioned embracing the trolley conveyor track to minimize accumulation thereon of ignitible dust deposits.

* * * * *